United States Patent Office 3,378,507
Patented Apr. 16, 1968

3,378,507
PRODUCING MICROPOROUS POLYMERS
Donald E. Sargent and Moyer M. Safford, Schenectady, N.Y., assignors to General Electric Company, a corporation of New York
No Drawing. Continuation-in-part of application Ser. No. 160,953, Dec. 20, 1961. This application July 1, 1965, Ser. No. 468,937
18 Claims. (Cl. 260—2.5)

ABSTRACT OF THE DISCLOSURE

Microporous polymers of monoethylenically unsaturated hydrocarbon are made by heating a mixture of the polymer and a water-soluble, anionic surfactant to a temperature where a homogeneous solution of the two components is obtained and thereafter cooling the composition to a temperature where the surfactant and polymer form two intermingled separate phases and thereafter dissolving the surfactant phase from the polymer. These compositions have a fibrillous structure having extremely fine pores. Such materials are useful as filters, filter media, or as binding compositions for ion-exchange resins.

---

This application is a continuation-in-part of our copending application Ser. No. 160,953, filed Dec. 20, 1961, now abandoned, and assigned to the same assignee as the present invention.

This invention relates to a process of producing solid, microporous hydrocarbon polymers and to the products produced by this process. More particularly, this invention relates to the process of incorporating into a solid, thermoplastic hydrocarbon polymer a water-soluble, anionic surfactant which is compatible with the hydrocarbon polymer and forms a homogeneous solution with the polymer at elevated temperatures, heating the composition to a temperature where the composition is homogeneous, cooling the composition to a temperature where the two materials are incompatible and forming a solid in which the polymer and surfactant are present as separate phases and dissolving the surfactant from the hydrocarbon polymer leaving the hydrocarbon polymer as a microporous structure.

Prior to our invention, porous structures were made by selectively dissolving a solid material from a heterogeneous mixture of the soluble solid, e.g., sodium chloride, sodium bicarbonate, starch, etc., and a polymer. Such a method is not suitable for making extremely fine, very uniform microporous structures, since the size of the pores is limited to the fineness of the soluble material added. Furthermore, the soluble material must be added in an amount large enough that the individual particles contact one another. If they do not, the particles will be completely encapsulated in the polymer and cannot be dissolved. The finer the particles the larger the quantity which must be added. On the other hand, the polymer has to be in sufficient quantity that a connecting network of polymer is formed so that the structure does not disintegrate when the soluble material is extracted. These two requirements severely restrict the amount included within the upper and lower limits to a narrow range of soluble material which can be added.

The lower limit of the amount of soluble solid that must be added in order that it can be dissolved is at least equal to and, generally, is at least four times the weight of polymer. These soluble solids do not melt or flow under the pressure and temperature conditions used to mix the soluble solid with the polymer or to shape or mold the mixture. As a result when the soluble solid and polymer are compounded together, the resulting mixture is so "stiff" and "dry" that it crumbles and powders in the mixing equipment before a uniform blend of the polymer and the soluble solid can be obtained. During molding or shaping such compositions, difficulty is experienced both in making the compound flow and the particles adhere together to get a well molded article. Consequently, great care, skill and control is required to obtain porous articles by such a process. Even so, on extraction of the soluble solid, nonuniform size pores are obtained because of the failure to obtain a uniform blend during the mixing operation and unfilled voids which are trapped during the molding operation.

One solution to the above problems is disclosed in Australian Patent 163,948. In this patent, it proposed to dry-mix the powdered polymer and the powdered soluble solid. A solvent for the polymer is added to the mixture in an amount to partially plasticize the polymer at room temperature, and to permit the wet-mixing of the blend into a cohesive mass. This partially plasticized mass is then shaped, e.g., by molding, extrusion, calendering, etc., during which time the solvent fully plasticizes the polymer. After evaporation of the solvent, the soluble solid is dissolved to produce the porous solid.

This method, although it has advantages over the previous process, still presents problems and has its limitations. The solvent used must have a high vapor pressure to prevent evaporation during compounding and to prevent gassing during the shaping or molding step. This makes the drying step a lengthy and costly process step because of the slow rate of evaporation. This requirement also restricts the number of solvents available for use. Furthermore, the requirement that the mixing of the polymer and soluble solid be carried out with the polymer in the partially plasticized state presents problems in finding a solvent for a particular polymer and the amount required to partially but not completely plasticize the resin.

The Australian patent gives details of the process for making porous polyvinyl chloride using starch or sodium bicarbonate as the soluble solid and various solvents, e.g., isophorone, cyclohexanone, tetrahydrofurfuryl alcohol, etc. The patent suggests that the process is applicable to a wide variety of thermoplastic polymers. However, it fails to disclose operable solvents to use with such polymers. In fact, although the patent teaches that polyethylene and polytetrafluoroethylene can be used, it is well known that there is no known solvent which will dissolve polyethylene at room temperature and no known solvent which will dissolve polytetrafluoroethylene. Therefore, it would not be possible to partially plasticize either of these polymers with a solvent at room temperature as taught in the patent, and polytetrafluoroethylene cannot be plasticized with a solvent at any temperature.

Although polyethylene can be dissolved in certain solvents at elevated temperatures, generally at 80° C. or higher, the solubility-temperature relationship is such that there is a sharp break at a given temperature below which the polymer is essentially insoluble and above which it is completely soluble. This makes it impossible to partially plasticize polyethylene with a solvent at elevated temperatures since the polymer becomes completely solvated or plasticized. It is also impossible to cool the blend of polymer, solvent and soluble solid, once it is made, without producing non-homogeneity due to the separation of the solvent from the polymer.

Even when one does successfully find the proper solvent and the proper proportions to use with a particular polymer, one is still faced with the fact that in shaping or molding the compound to the desired shape, it is possible for the plasticized resin to flow faster than the soluble solid filler thereby producing polymer-rich and polymerpoor areas in the formed article which produces a non-homogeneous-porous structure when the soluble solid is dissolved.

Furthermore, when the solvent is evaporated from the shaped article, warping of the article occurs, especially if the shaped article has sections of different thicknesses. The dried article is very brittle and care must be taken in handling and processing it through the extraction step.

Another method of making porous products is to incorporate a thermally decomposable material into a polymer followed by heating to cause decomposition of the thermally decomposable material and expansion of the polymer into a porous structure. Such a process requires careful compounding of the composition to avoid premature decomposition, as well as careful control of the amount of material placed in the vessel in which it is to be formed, such as a mold, so that just enough material is added to completely fill and shape the formed, porous article. Furthermore, thermally decomposable materials are generally dangerous to handle and relatively expensive.

Other methods have also been used, e.g., volatilization of a solvent, use of an extractable plasticizer, sintering, bonding with an adhesive, etc., but these methods also fail to give the very uniform, fine porous structure and ease of control that we obtain by our process.

We have now found a simple method for making porous articles which essentially eliminates all of the drawbacks of the prior art processes. Our process permits the making of extremely fine, solid, microporous articles having a very uniform pore structure in which the pores are interconnected, yet permits the quantity of extractant to be varied over a wide range to produce microporous polymers having a wide range of apparent densities or degree of porosities.

Our process is applicable to the making of microporous articles from all solid, thermoplastic polymers of mono-ethylenically unsaturated hydrocarbons using water-soluble, anionic surfactants as the pore forming medium. It will be readily apparent to those skilled in the art that the particular polymer or copolymer chosen must be one which has enough rigidity that the reticulated structure does not collapse due to the resin flowing or contracting after removal of the surfactant at temperatures below the maximum temperature at which the microporous article will be used. In other words the polymer should not cold-flow in the temperature range of its use as a microporous article nor should it contract due to plastic or elastic memory after the surfactant is extracted. In other words, the polymer should be one that is capable of forming a self-supporting reticulated structure. In practicing our invention, we incorporate the water-soluble, anionic surfactant into the solid, thermoplastic polymer by any suitable means; for example, the two may be blended together in the dry state or by dissolving one or both in a suitable solvent followed by evaporation of the solvent, but preferably are blended together by heating and mixing on hot compounding rolls or otherwise suitably mixed, for example, by use of a Banbury or other suitable blender, etc., at elevated temperatures where the two materials are mutually soluble to obtain a completely uniform distribution of the surfactant in the polymer and without the necessity of evaporating the solvent. As far as we can determine all anionic surfactants and all solid, thermoplastic polymers of monoethylenically unsaturated hydrocarbons form a homogeneous mixture at a temperature determined by the higher of either the melting point, the surfactant or the softening temperature of the polymer. Often, where the surfactant melts below the softening temperature of the polymer, the molten surfactant plasticizes and reduces the flow temperature of the mixture. This compound is sheeted, molded or extruded to form it into the desired shaped object, using a temperature high enough so that the surfactant and polymer form a homogeneous solution. The shaped article is cooled to a temperature where the surfactant is incompatible with the polymer and the two materials separate as a solid having two intermixed, separate, continuous phases, in which the polymer forms the microporous structure and the surfactant fills the pores, without any apparent syneresis. The polymer is a solid, integral, structurally strong network or reticulated structure surrounding the entrapped continuous phase of surfactant. Since the surfactant is a separate, continuous phase it can be dissolved out leaving the polymer as a unitary, microporous solid.

The surfactant is extracted with a solvent, in which the surfactant is soluble but the polymer is insoluble at the temperature used for the extraction. As far as we can determine, all the water-soluble, anionic surfactants separate from the polymer by the time the composition is cooled to at least within the range of 50–75° C. In general, for convenience's sake and ease of further processing, we cool to ambient temperature. The choice of solvent is governed chiefly by the procedure chosen for extraction of the surfactant. The only requirement it must meet is that it dissolve the surfactant but not the polymer at the temperature used for extraction. Although other solvents than water and the lower aliphatic alcohols can be used to dissolve the surfactant, for example, ketones, ethers, and other higher boiling solvents which are non-solvents for the polymer at the temperature used for extraction, for convenience we generally use water or one of the readily available, low cost, low boiling solvents, e.g., alcohols, to extract the surfactant from the polymer, and to hasten this dissolution we usually use warm or hot solvent. A condensing vapor phase or other suitable method can also be used to remove the surfactant. The surfactant and solvent may be recovered and reused by evaporation, spray-drying, etc., of the solution of the surfactant in the solvent.

In practicing our invention, any solid, thermoplastic polymer of a mono-ethylenically unsaturated hydrocarbon may be used, examples of which are the various polymers and copolymers produced by the polymerization of mono-ethylenically unsaturated hydrocarbons which may be substituted with aryl substituents, for example, phenyl, tolyl, dimethyl-phenyl, naphthyl, etc. Preferably, the mono-ethylenically unsaturated hydrocarbon has from 2 to 8 carbon atoms in the unbranched part of the olefinic chain and preferably the ethylenic unsaturation is between the terminal and its adjacent carbon atom, i.e., $CH_2=C<$. Such unsaturated hydrocarbons are known as 1-alkenes or alpha-olefins. Specific examples are the polymers and copolymers of two or more of the following mono-ethylenically unsaturated hydrocarbons: ethylene, propylene, 1-butylene, 1-isobutylene, 4-methyl-1-pentene, 4-ethyl-1-hexene, 1-octene, 1-hexene, styrene, vinyltoluene, vinylnaphthalene, etc. The preferred polymers are the polymers of alkenes included in the scope of a $C_{2-8}$ alkene-1, and especially, polymers of ethylene and polymers of propylene. Mixtures which are blends of two or more of these polymers, rather than copolymers, likewise may be used.

Also, minor amounts of polymerizable monomers other than mono-ethylenically unsaturated hydrocarbons, e.g., 1,3 - butadiene, 2,4 - dimethyl-1,3-butadiene, isoprene, acrylic acid and its esters, methacrylic acid and its esters, vinyl esters, vinyl ethers, etc., may be copolymerized with the mono-ethylenically unsaturated hydrocarbons or the polymers of the former may be mixed in minor amounts with the polymers of the latter. In choosing any of the copolymers or mixed polymers, it will be readily apparent that either the properties or the quantity of the other monomer incorporated into the copolymer or the other polymer mixed with the polymer of the mono-ethylenically unsaturated hydrocarbon should not so greatly decrease either the solubility of the surfactant or the rigidity, i.e., cold-flow properties, of the resulting composition that it would be unsatisfactory for making microporous articles by our process. In other words, the properties of the resulting composition should more nearly resemble the properties of the polymers of the mono-ethylenically unsaturated hydrocarbon than they do the polymers of the modifier. Such compositions are properly included in the term: polymers of a mono-ethylenically unsaturated hydrocarbon.

In U.S. Patent 2,466,826, a detergent rubber composition and a method of making it is disclosed. In making this composition, a detergent is incorporated into a synthetic rubber, along with fillers, curing agents and, a foaming agent, if a foamed product is desired. The composition is vulcanized by standard techniques to produce a sponge-like scouring pad, if a foaming agent is used, or a solid scouring pad, if no foaming agent is used. The sponge pad releases the detergent more readily during use than the solid pad. In fact, it takes a long time to wash all of the detergent from the solid product. We have found, that the solid pad, even after washing out all of the detergent does not give a microporous composition similar to that obtained by our process. The products obtained by our process, when dried after extraction of the surfactant, will readily soak up water in proportion to the amount of surfactant initially present. They may be repeatedly dried and wet with no loss in ability to absorb water as long as the pore structure is not destroyed or insoluble materials deposited in the pores during the drying step. In marked contrast, the solid rubber pad containing 20% detergent when washed so as to remove all of the detergent as shown by a 20% weight loss after washing and drying, will absorb less than 1% water even when vacuum impregnated. An approximate 10% decrease in volume occurred during the removal of the detergent compared to no perceptible loss in volume on removal of the surfactant from our compositions.

Any of the water-soluble, anionic surfactants are suitable for our process. The broad class of water-soluble, anionic surfactants are alkali metal salts, e.g., lithium, sodium, potssium, rubidium and cesium, salts of organic compounds having both a hydrophobic hydrocarbon group and a hydrophilic ionizable group, for example, one or more carboxylic acid, sulfonic acid, or sulfuric acid monoester groups. Examples of these materials are, for example: the alkali metal salts of the $C_{12-18}$ carboxylic acids, e.g., lauric acid, myristic acid, oleic acid, stearic acid, palmitic acid, etc., which are generally known as soaps; alkali metal salts of aliphatic, aromatic, aralkyl, and alkyl aromatic sulfonic acids, which may be substituted with other groups such as amino, amido, hydroxyl, ester, ether, sulfone, etc., groups, the alkali metal salts of sulfuric acid monoesters, etc.

Specific examples of anionic surfactants we can use, using the sodium salt which is the preferred alkali metal salt for illustration, although the other alkali metal salts are equally applicable, but more costly to use, are: sodium laurate, sodium palmitate, sodium oleate, sodium stearate, as well as mixtures which are obtained by the alkali metal hydroxide hydrolysis of naturally occurring fats which are readily available commercially as soap,
sodium octadec-9-ene sulfonate,
sodium ethylcyclohexane-p-sulfonate,
sodium naphthalenesulfonate,
sodium tetrahydronaphthalenesulfonate,
sodium butoxy-butylnaphthalenesulfonate,
sodium butylbenzene sulfonate,
sodium butylphenylphenolsulfonate,
sodium amylbenzyl sulfonate,
sodium tetradecylhydroxybenzenesulfonate,
disodium dibutylphenylphenoldisulfonate,
sodium 2-ethylhexyl o-sulfobenzoate,
sodium-N-heptadecyl-ethylsulfoacetamide,
sodium dodecyloxyethylsulfonate,
sodium N,N-diamylaminonaphthalenesulfonate,
sodium dodecylsulfate,
sodium cetylsulfate, etc.

Additional general and specific examples of water-soluble anionic surface active agents suitable for our process are given, for example, in the book, "Surface Activity," J. L. Moilliet and B. Collie, D. Van Nostrand Company, Inc., New York, 1951, pages 245–323, and the references cited therein. Although water-soluble anionic surfactants which are either solid or liquid at room temperature may be used, we prefer to use those which are solid. This preference is based on our observation that the liquid surfactants do not readily wash out as completely from the solid hydrocarbon polymer as do the solid surfactants. In choosing the surfactant, it is desirable to choose one that has a melting point below the temperature required to mold or shape the blend of surfactant and polymer. This obviates using a higher temperature to make the mixture homogeneous.

Surprisingly enough, we found that the closely related non-ionic and cationic surfactants were not suitable for our process, and also that even the anionic surfactants could not be used with such closely related polymers as polyvinyl chloride, methyl methacrylate, and other similar polymers, to make microporous products.

We have also determined that microporous products can be obtained with the solid, thermoplastic polymers of a mono-ethylenically unsaturated hydrocarbon and the anionic surfactants only when the concentration of the anionic surfactant in the polymer is greater than 25%, and no more than 90% by weight of the total weight of the surfactant and the hydrocarbon polymer, and preferably in the range of 35 to 75% where good strength is coupled with a desirable degree of porosity. If the amount of surfactant is 25% or less, it is not possible to extract the surfactant from the polymer after it has been incorporated by heating, apparently because the polymer completely surrounds the surfactant phase and prevents its extraction. If the amount of surfactant is greater than 90%, the hydrocarbon structure left after extraction of the surfactant is extremely porous and too weak to be of any utility. If a structurally strong microporous polymer is desired, the concentration of surfactant used should be in the low range, but if a highly porous polymer is desired, the concentration of the surfactant should be in the high range. Compositions in the middle of the range give a good balance of strength and porosity. Softness and flexibility are dependent on the polymer. For example, the microporous objects from polystyrene are hard and rigid while those from polyethylene are soft and flexible.

Our process has many advantages and overcomes many of the problems of the prior art processes. The amount of surfactant can be varied over a wider range than the prior art extractive pore formers. Because the surfactants have melting points compatible with the processing temperatures of the polymer, the surfactants, even when present in an amount 9 times the weight of the polymer do not cause the mixture to become "stiff" and "dry" as do mixtures of the same polymer with starch or inorganic salts. In fact, by using surfactants that melt below the normal processing and molding temperatures of the polymer, our mixtures of polymer and surfactant act as though they were plasticized and are easier to mold than the polymer alone.

Since there is no solvent to evaporate, there is no trouble due to shrinking, cracking or warping. Also, there is no time delay necessary between forming the article and extracting the soluble phase. Because the pores are formed by the surfactant phase separating out from the homogeneous mixture, the pore structure and type of microporous plastic obtained by our process is entirely different from that obtained by any of the prior art processes whose pore size depends on the size and shape of gas bubbles or size and shape of soluble, solid particles.

The advantage of our process is that it permits the article to be shaped to the desired form without the formation of a skin which would have to be removed and discarded. The surfactant is readily removed and yet the final porous product is the same shape and size as the object before extraction. Sheets of the material have the feel of soft glove leather. As far as we can determine, there is very little shrinkage, if any, which occurs when the surfactant is extracted from the composition. Likewise, during the shaping of the composition, there is no increase in size as would be obtained if a thermally decomposable foaming agent were used.

In order that those skilled in the art may more readily understand our invention, the following examples are given by way of illustration and not by way of limitation. All percentages and parts are by weight, unless otherwise stated.

Example 1

Table I shows the composition of various compounds which were made using a solid polyethylene as the solid, thermoplastic, polymer of a mono-ethylenically unsaturated hydrocarbon and sodium bis(2-ethylhexyl)sulfosuccinate as the water-soluble, anionic surfactant.

TABLE I

| Sample | Percent Polyethylene | Percent Surfactant |
|---|---|---|
| A | 10 | 90 |
| B | 15 | 85 |
| C | 25 | 75 |
| D | 33⅓ | 66⅔ |
| E | 50 | 50 |
| F | 65 | 35 |
| G | 75 | 25 |
| H | 90 | 10 |

Each of the above compositions was milled on hot differential rolls at 120–130° C. until the two components formed a homogeneous blend. The material was sheeted off and molded in a flash type mold at 130° C. to form sheets 30 mils thick. After cooling, the sheets were removed from the mold and washed in running distilled water. Composition H was not wet by the water and it was impossible to extract out the surfactant. Even boiling methanol would not dissolve the surfactant from the polyethylene, although the surfactant was methanol-soluble. Composition G was slightly wet by the water and a limited amount of the surfactant could be washed from the compositions. Compositions A through F were readily wet by water and the surfactant could be readily washed from these compositions. When dry the microporous compositions had the feel of soft glove leather and were not wet by water although water could be drawn through them by vacuum. When weighed these samples showed that essentially all of the surfactant was capable of being washed from these compositions. There was essentially no change in dimensions between the washed and unwashed samples yet the weight now corresponded within a few percent or less with the actual weight of polyethylene used. Later work showed that more complete washing could reduce the weight so that it was essentially identical to the weight of polyethylene. The flexibility of the compositions decreased progresively from F to A and the strength of the compositions increased from A to F. Sample A was somewhat fragile because of its high porosity and the resulting very thin walls of the polyethylene network. The results of this test showed that to produce satisfactory compositions the amount of surfactant incorporated in the polymer should be greater than 25% but no more than 90% of the total weight of the polymer and surfactant.

Example 2

In the same manner as Example 1, 75 parts by weight of the following water-soluble, anionic surfactants were incorporated in 25 parts by weight polyethylene:

TABLE II

| Sample: | Surfactant |
|---|---|
| A | Sodium N-methyl-N-oleyltaurate. |
| B | Sodium lauryl sulfate. |
| C | Sodium dibutylnaphthalenesulfonate. |
| D | Ordinary soap flakes (pure). |

Molded sheets of these compositions were prepared as described in Example 1. In each case, the surfactant was readily washed from the composition to produce pliable, tough, microporous polyethylene sheets. Like the microporous products produced in Example 1, there was no evidence of a skin of non-porous polyethylene on the surface. The entire structure was uniformly porous.

Attempts were made to incorporate non-ionic and cationic surfactants, e.g., nonylphenoxypoly(oxyethylene) ethanol, polyoxyethylated fatty alcohols, polyoxyethylated fatty acids, polyoxyethylated vegetable oil, copolymers of polyoxyethylene and polyoxypropylene, polyethylene glycol ethers, mixed alkyl amine salts containing an average of 18 carbon atoms in the alkyl group, etc., into polyethylene. The non-ionic surfactants were noncompatible with the polyethylene and would not mix with the polyethylene while the cationic surfactants, although they milled in and the compositions could be molded, could not be washed out from even a 50% surfactant 50% polyethylene composition by water, ethanol, hydrochloric acid-isopropanol mixture, acetic acid-isopropanol mixture, decane, or xylene.

Example 3

Two compositions were made each containing 25% solid polypropylene and 75% of a water-soluble anionic surfactant which in Sample A was ordinary, pure soap flakes (sodium salt of long chain aliphatic, i.e., $C_{12-18}$, carboxylic acids) and in Sample B was sodium di(2-ethylhexyl) sulfosuccinate. Each of these compositions was compounded to homogeneous compositions by milling on differential rolls heated to a temperature of 165° C. These two compounds were molded as in Example 1 using a mold temperature of 170° C. When washed in running distilled water, each of the molded sheets produced white, microporous polypropylene sheets having essentially the same dimensions as the molded sheets before washing.

Example 4

Two compositions were made, each containing 50% solid polystyrene and 50% of a water-soluble anionic surfactant which in Sample A was ordinary, pure soap flakes and in Sample B was sodium di(2-ethylhexyl) sulfosuccinate. Each of these compositions was homogeneously blended by sheeting on differential rolls heated to 125° C. Each of the compounds was pressed into a sheet at 150° C. and cooled. After washing thoroughly with warm water, microporous polystyrene sheets were obtained in both cases having essentially the same dimensions as the molded sheets before washing. Neither vinyl chloride nor methyl methacrylate would form homogeneous mixtures with these two surfactants when substituted for the polystyrene in Example 4.

Example 5

Two compositions were made, each containing 15% solid polyethylene, 10% solid polybutadiene obtained by the polymerization of butadiene with sodium, ½% dicumyl peroxide and 75% of a water-soluble anionic surfactant which in Sample A was sodium di(2-ethylhexyl) sulfosuccinate and in Sample B was sodium N-methyl-N-oleyl-taurate. These two compositions were milled in differential rolls heated to 130° C. until a homogeneous compound was obtained. Two 3 inch x 3 inch x 30 mil slabs were molded from each compound at 130° C. in the same way as in Example 1 and one slab from each composition was further cured by heating in the mold at 170° C. for 30 minutes. The surfactant was easily removed from all four compositions with water to give white microporous polyethylene sheets. Samples from the two sheets which had been heated to only 130° C. during molding were soluble in boiling xylene, whereas samples from the sheets which had been further heated at 170° C. were insoluble in boiling xylene showing that it was posible to cross-link these compositions with dicumyl peroxide. Other peroxides which are suitable for curing these compositions are, for example, peroxides disclosed in U.S. Patent 2,888,424 and copending application, Ser. No. 132,664, filed Aug. 21, 1961, now U.S. Patent No. 3,334,080, and assigned to the same assignee as the present invention.

Example 6

Two compositions were made containing 25% solid polyethylene and 75% of a water-soluble anionic surfactant which in Sample A was ordinary, pure soap flakes and in Sample B was sodium di(2-ethylhexyl) sulfosuccinate. These two compositions were milled to a homogeneous compound and molded as in Example 1 and irradiated with high energy ionizing radiation at room temperature to a dose of $5 \times 10^8$ rep. using the high energy electrons as the source of radiation emanating from the equipment such as that described in U.S. Patent 2,906,679. In order to effectively penetrate these compositions, the radiation should have a minimum energy of at least 50,000 electron volts. At the same time, a sample of the microporous polyethylene corresponding to that of Sample E in Table I was irradiated to a dose of $2 \times 10^7$ rep. This sample was cross-linked as shown by the fact that it would not dissolve in boiling toluene, whereas it would prior to irradiation. When two samples of irradiated material containing the surfactants were placed in water, it was found that the sample containing soap flakes showed very little weight loss when washed for 24 hours in running water, whereas the weight after washing of the sample which had been irradiated containing the sodium di(2-ethylhexyl) sulfosuccinate was 31.4% of the original weight. At first it was thought that perhaps the soap had reacted in some way with the polyethylene but it was later found that treatment with dilute sulfuric acid, washing with running water and extracting with boiling methanol was capable of extracting the soap from the polyethylene to produce a white, microporous polyethylene. Treatment of the washed irradiated sample containing sodium di(2-ethylhexyl) sulfosuccinate in the same manner also removed essentially all of the balance of the surfactant from this sample. Samples of both of these compositions after they were in the form of microporous polyethylene were found to be insoluble in boiling toluene, showing that they also had been cross-linked even in the presence of the surfactant.

Example 7

To test whether other materials which were solvents for the solid, thermoplastic hydrocarbon polymers at elevated temperatures but non-solvents at lower temperatures would act in the same way as the water-soluble, anionic surfactants, two mixtures of solid polyethylene and xylene were made. Sample A contained 50% of each and Sample B contained 70% polymer and 30% solvent. Each sample was well mixed to coat the polymer granules with solvent, sealed in a container and heated to 100° C. until a clear viscous solution was obtained. On cooling the solutions became cloudy and gelled, but by the time the samples had cooled to room temperature the gels had shrunk considerably so that the surfaces were concave and xylene had been expelled from the gel so that it could be poured from the container. A skin of polymer had formed on the surfaces of the polymers so that when the latter were placed in methyl alcohol to replace the xylene with a more volatile liquid it required at least 5 changes of solvent with long soaking times between each solvent change before there was no evidence of xylene being extracted as denoted by a heavier phase forming in the bottom of the container under quiescent conditions. The methyl alcohol and any remaining xylene were evaporated under vacuum at room temperature. Examination of the interior of the samples showed that the shrinkage of the gel had caused internal voids to form.

In view of these results a third sample was made in which the granules of polyethylene were soaked overnight in xylene at ambient temperature. Excess xylene was decanted and the polymer and sorbed solvent were heated to 100° C. in a closed container. Xylene was added in small quantities until a clear solution was obtained. This solution was used to cast a circular disc, 1¹⁵⁄₁₆ inches in diameter and ⅜ inch thick in a closed container, which was clear and free of bubbles at 100° C. The disc was quenched in methanol in the hopes that shrinkage and skin formation would be prevented. However, shrinkage was immediately evident and a skin had formed on the surface of the disc but not as thick a skin as had formed by slow cooling. When further treated as described above to remove the liquids it was found that the disc had shrunk to 1⁹⁄₁₆ inches in diameter and ¼ inch thick. The sample did not have the feeling of glove leather and was easily broken when flexed.

Example 8

Two compositions were made with solid polyethylene, one using starch and the other using sodium bicarbonate as the pore forming ingredient, and the general procedure of Australian Patent 163,948. Decalin, which is one of the best solvents for polyethylene, was chosen as the temporary plasticizer since its boiling point is higher than the temperature needed to process and mold the compositions.

SAMPLE A

| | Parts |
|---|---|
| Polyethylene | 10 |
| Sodium bicarbonate | 80 |
| Decalin | 25 |

SAMPLE B

| Polyethylene | 10 |
|---|---|
| Starch | 50 |
| Decalin | 25 |

The best method for making these compositions is to mix the polyethylene and Decalin and heat at 130° C. with stirring to obtain a clear solution. The amount of Decalin used was the minimum amount that gave a clear solution. While maintaining the temperature, the sodium bicarbonate and starch were mixed into their respective polyethylene solutions and thoroughly blended. Composition A required preheating to 135° C. in a closed container to prevent loss of Decalin in order to be molded at 135–140° C. with a preheated mold. Composition B could be readily molded by placing the composition in a mold and heating both the mold and composition to 135–140° C. Both compositions are quite brittle at this stage and must be handled with great care to prevent breaking or cracking. The Decalin was evaporated from both samples in an air circulating oven at 80° C.

Both samples were placed in 1% aqueous sulfuric acid which readily extracted the sodium bicarbonate from A, but B, even after two days of treatment, still required several hours heating at just below the boiling point to dissolve the starch. After drying, A weighed 11.2% and B weighed 21.6% of their weight before extraction.

Photomicrographs of these samples showed that the pore structure of A was entirely different from that of B. Sample A had a mixture of fine and coarse pores which were irregular in shape. The pores of B appeared as though they were voids randomly distributed between coalesced, yet still discernible as individual particles of the polymer. Photomicrographs of Samples C, E and F of Example 1, as well as a sample made as a repeat of Sample D showed that, irrespective of the initial amount of surfactant, the porous structure of the product was the same, very unique fibrillous-like pores interwoven with the fibrillous structure of the polyethylene somewhat suggestive of a marbelized appearance of a two color bowling ball. The effect is the same as the striations one notices when a liquid of heavier density is allowed to descend, without stirring, through a liquid of lower density with which it is compatible. Such a structure is impossible to obtain by any of the prior art processes. The fibrillous structure may well account for the leather-like feel of this material.

Example 9

Two compositions were made using the method disclosed in U.S. Patent 2,466,826. In Sample A the synthetic rubber was butadiene-acrylonitrile and in Sample B it was butadiene-styrene. Each composition contained:

| | Parts |
|---|---|
| Synthetic rubber | 100.0 |
| Zinc oxide | 15.0 |
| Benzothiazyl disulfide | 2.0 |
| Diphenyl guanidine | 1.0 |
| Sulfur | 1.5 |
| Aquarex–D | 50.0 |
| Marter white | 50.0 |
| Carbon black | 20.0 |

The above ingredients were milled together on heated, differential rolls using standard rubber compounding techniques. The compositions were vulcanized into 47 mil thick sheets in a flash-type mold using a vulcanization temperature of 150° C. and a molding time of 20 minutes. These two samples slowly released the Aquarex–D detergent when washed with distilled water. After no more detergent could be detected in the wash water, the samples were vacuum dried. The loss in weight was 20.3% for Sample A and 20.1% for Sample B due to the washing out of the detergent. However, when these samples were vacuum impregnated with water, the gain in weight was only 0.35% for both Samples A and B. This shows that if the products are porous at all after extraction of the detergent, the porosity is not capable of reabsorbing water and is entirely different from the porosity obtained in our products. This may be due to the fact that the Aquarex–D did not form a homogeneous phase. The following example shows the need for forming a homogeneous phase even with polymers of monoethylenically unsaturated hydrocarbons.

Example 10

Aquarex–D has a melting point of about 215–218° C. which is relatively high for surfactants which are usually liquids or low melting waxy solids. A mixture of 100 parts polyethylene and 50 parts Aquarex–D was made by milling the two together at 130° C. When a small sample was observed at a slow rate of heating on a hot stage of a microscope between crossed Polaroid filters, the dispersion of the surfactant as a separate phase was readily observed up to a temperature of 162° C. Above this temperature, dissolution of the surfactant occurred but was not complete until a temperature of 205° C. was attained. Separation of the surfactant as a separate phase on cooling did not occur until the temperature of 136° C. was reached.

Two molded samples were made from this composition, Sample A at a molding temperature of 135° C. and Sample B at a molding temperature of 225° C. When washed with distilled water the surfactant, although removed from both samples, was more easily removed from Samples B. When vacuum impregnated with water, Sample A gained less than 1% in weight whereas Sample B gained about 20%, showing the marked effect on the porosity due to formation of a homogeneous mixture of the polymer and surfactant during the molding step. This effect is more readily apparent when the surfactant is used in the lower range, i.e., 25–30%.

Example 11

The following samples of molded sheets were made using the general procedure of Example 1 for the polyethylene compositions and Example 4 for the polypropylene and polystyrene compositions. The surfactant was di-(2-ethylhexyl)sulfosuccinate for all compositions.

| Sample | Percent and Type Polymer | Percent Surfactant |
|---|---|---|
| A | 66⅔ Copolymer of ca. 95% ethylene and 5% butene-1. | 33⅓ |
| B | 66⅔ Polyethylene | 33⅓ |
| C | 33⅓ Polyethylene | 66⅔ |
| D | 33⅓ Copolymer of ca. 80% styrene 20% 1,3-butadiene. | 66⅔ |
| E | 33⅓ Copolymer of ca. 97% ethylene 3% acrylic acid, 70% of the carboxyl groups in form of sodium salt. | 66⅔ |
| F | 33⅓ Polystyrene | 66⅔ |

After washing with distilled water until free of surfactant and then vacuum dried at 50° C., the above samples showed the following percentages of their initial weight.

| Sample: | Percent |
|---|---|
| A | 67.6 |
| B | 71.7 |
| C | 34.8 |
| D | 32.2 |
| E | 35.2 |
| F | 34.2 |

After vacuum impregnation with water, the percentage of water absorbed, based on the impregnated weight, was as follows:

| Sample: | Percent |
|---|---|
| A | 29.4 |
| B | 29.4 |
| C | 61.4 |
| D | 56.3 |
| E | 48.0 |
| F | 62.5 |

On vacuum drying the samples returned to within a few milligrams of their previously dried weight except for Sample E which showed a further loss in weight indicative that additional surfactant had been removed.

These examples show that the type of microporous polymers obtained by our method are unique and the results are not due to merely the use of the surfactant as a solvent which will dissolve the polymer at elevated temperatures and form a gel or solid when cooled.

Because of their high porosity and physical and chemical properties, the microporous polymers of this invention have many and varied uses. For example, they can be used to make molded articles of any desired shape either alone or mixed with various fillers, such as wood flour, diatomaceous earth, carbon black, silica, fibrous materials such as glass fibers, asbestos fibers, cotton fibers, etc., to make molded parts which are buoyant and will float in water, to make filters or filter media for use in process equipment to clarify solutions, to make cigaret filters, etc., or can be used as a matrix to absorb liquids such as dye solutions, inks, etc., to serve as a reservoir for example as in the making of a stamp pad, etc., Likewise, the compound containing the surfactant can be used to calender, coat or impregnate one or more surfaces of a substrate material, for example, cloth, paper, or other fibrous material, etc., or a solid surface, for example, metal sheets, wood, etc., or can be used to extrude a coating over another material, for example wire, threads, tubes, etc., to leave after extraction of the surfactant with water, a microporous coating on these articles which is excellent thermal insulation. Sheets or blocks of the microporous plastic may likewise be used to thermally insulate other objects such as pipe, refrigerators, etc.; cloth which has either been coated or impregnated with the solid hydrocarbon polymer containing the water-soluble anionic surfactant which is then converted to a microporous polymer may be fabricated into gloves, thermal clothing such as underwear, etc. Sheets make ideal battery separators.

Metal powders, conductive solids, e.g., conductive carbons, metallized non-conductors, etc., may be incorporated into the solid thermoplastic, hydrocarbon polymer along with the water-soluble anionic surfactant to make a microporous conductive article, e.g., sheets, after extraction of the surfactant, which are suitable for electrodes in electromotive cells, e.g., fuel cells, decorative articles, electrical conductors, etc. Likewise, insoluble, infusible, cation and anion exchange resins, powders or granules may be incorporated as fillers to permit fabrication of any desired shape, or object; for example, sheets, diaphragms, etc., in which the microporous polymer forms the bonding structure for the ion exchange resins which will have a higher exchange capacity than the same ion-exchange resin bonded with a non-porous resin because of the greater contact surface available to the liquid being treated. Such structure would be ideally suited for such applications as, for example, water-treatment, the making of a solid electrolyte for fuel cells, especially for those of the matrix type where liquid electrolyte is present within the porous structure of the microporous polymer bonding the ion-exchange resin particles, etc.

Obviously, other modifications and variations of the present invention are possible in light of the above teachings. It is therefore to be understood that changes may be made in the particular embodiments of the invention described which are within the full intended scope of the invention as defined by the appended claims.

What we claim as new and desire to secure by Letters Patent of the United States is:

1. The method of making a microporous polymer which comprises (a) heating a mixture comprising a solid thermoplastic polymer of a mono-ethylenically unsaturated hydrocarbon and a water-soluble, anionic surfactant in the form of its alkali metal salt to a temperature where the said polymer and surfactant are mutually soluble, the weight of said surfactant being greater than 25 and no more than 90% by weight of the total weight of the said surfactant and the said polymer, (b) cooling the mixture to a temperature where the polymer and surfactant form two intermingled, separate phases, and (c) dissolving the surfactant phase from the polymer.

2. The method of claim 1 wherein the surfactant is an alkali metal salt of a $C_{12-18}$ alkyl carboxylic acid.

3. The process of claim 1 wherein the surfactant is an alkali metal salt of a sulfoalkyl carboxylic acid ester.

4. The process of claim 1 wherein the surfactant is an alkali metal salt of a tertiary-amino aliphatic sulfonic acid.

5. The process of claim 1 wherein the surfactant is an alkali metal salt of a sulfuric acid monoester of an aliphatic alcohol.

6. The method of claim 1 wherein the surfactant is an alkali metal salt of a sulfonic acid.

7. The process of claim 1 wherein the hydrocarbon polymer is a polymer of a $C_{2-8}$ alkene-1.

8. The process of claim 1 wherein the hydrocarbon polymer is a polymer of a $C_{2-8}$ alkene-1 and the surfactant is an alkali-metal salt of a $C_{12-18}$ alkyl carboxylic acid.

9. The process of claim 1 wherein the hydrocarbon polymer is a $C_{2-8}$ alkene-1 and the surfactant is an alkali-metal salt of the carboxylic acids obtainable by the hydrolysis of natural fats.

10. The process of claim 1 wherein the hydrocarbon polymer is a $C_{2-8}$ alkene-1 and the surfactant is a sodium salt of the carboxylic acids obtainable by the hydrolysis of natural fats.

11. The process of claim 1 wherein the polymer is a polymer of propylene.

12. The process of claim 1 wherein the polymer is a polymer of styrene.

13. The process of claim 1 wherein the polymer is a polymer of ethylene.

14. The process of claim 1 wherein the polymer is a polymer of ethylene and the surfactant is the sodium salt of the carboxylic acids obtainable by the hydrolysis of natural fats.

15. The process of claim 1 wherein the polymer is a polymer of ethylene and the surfactant is sodium di(2-ethylhexyl) sulfosuccinate.

16. The process of claim 1 wherein the hydrocarbon polymer is a polymer of ethylene and the surfactant is sodium N-methyl-N-oleyltaurate.

17. The process of claim 1 wherein the hydrocarbon polymer is a polymer of ethylene and the surfactant is sodium lauryl sulfate.

18. The process of claim 1 wherein the hydrocarbon polymer is a polymer of ethylene and the surfactant is sodium dibutyl naphthalene sulfonate.

References Cited

UNITED STATES PATENTS

| | | |
|---|---|---|
| 2,466,826 | 4/1949 | Romaine. |
| 2,568,866 | 9/1951 | Osterof et al. |
| 2,884,387 | 4/1959 | Bieber et al. |

FOREIGN PATENTS

| | | |
|---|---|---|
| 163,948 | 7/1952 | Australia. |

MURRAY TILLMAN, *Primary Examiner.*

M. FOELAK, *Assistant Examiner.*